Feb. 11, 1958 M. RECHT 2,822,725

COMBINED SOUND AND PICTURE PROJECTING APPARATUS

Filed Aug. 13, 1954 3 Sheets-Sheet 1

Inventor
Maximilian Recht
By
Harry Jacobson
Attorney

Feb. 11, 1958 M. RECHT 2,822,725

COMBINED SOUND AND PICTURE PROJECTING APPARATUS

Filed Aug. 13, 1954 3 Sheets-Sheet 2

Inventor
Maximilian Recht
By
Harry Jacobson
Attorney

Feb. 11, 1958 M. RECHT 2,822,725

COMBINED SOUND AND PICTURE PROJECTING APPARATUS

Filed Aug. 13, 1954 3 Sheets-Sheet 3

Inventor

By Maximilian Recht

Harry Jacobson

Attorney 2,822,725

COMBINED SOUND AND PICTURE PROJECTING APPARATUS

Maximilian Recht, Bronx, N. Y.

Application August 13, 1954, Serial No. 449,665
18 Claims. (Cl. 88—27)

This invention relates to combined sound and picture projectors and particularly to the means for supporting and operating the parts so as to provide a small, portable, self-contained device which may be set up and used anywhere.

While many attempts have previously been made to produce a combined phonograph and projector especially for home or office use, such attempts have not been practical primarily because of the intricate, cumbersome or expensive nature thereof, by reason of which previous devices of the type here involved have not gone into extensive commercial use.

The present invention therefore contemplates the provision of a simple, efficient, dependable and economical portable device including a phonograph and projector for still slides having a minimum number of parts, not likely to get out of order, for intermittently rotating a picture carrying disc in synchronism with the sound produced by the continuously rotating phonograph record, whereby a great variety of applications and uses becomes possible, not only in the educational and entertainment fields, but in commercial fields as well.

The various objects of the invention will be clear from the description which follows and from the drawings, in which Fig. 1 is a top plan view partly broken away of the device, showing the means for supporting the picture disc and the picture projecting means and showing the carrying case for the device in its open or operative position.

Figures 1, 2:
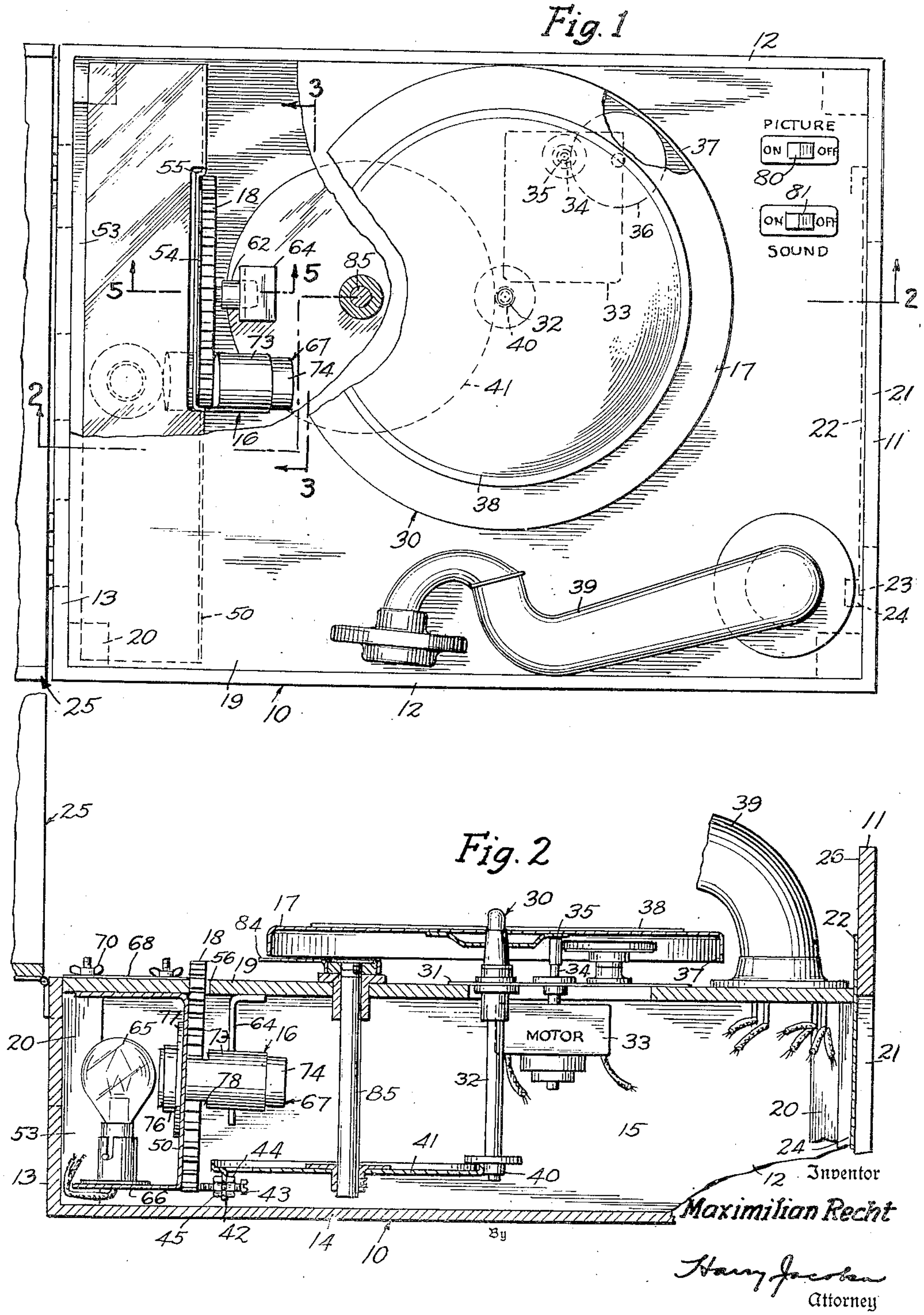
Fig. 2 is a fragmentary vertical sectional view of the same taken on the line 2—2 of Fig. 1.
Figure 9:
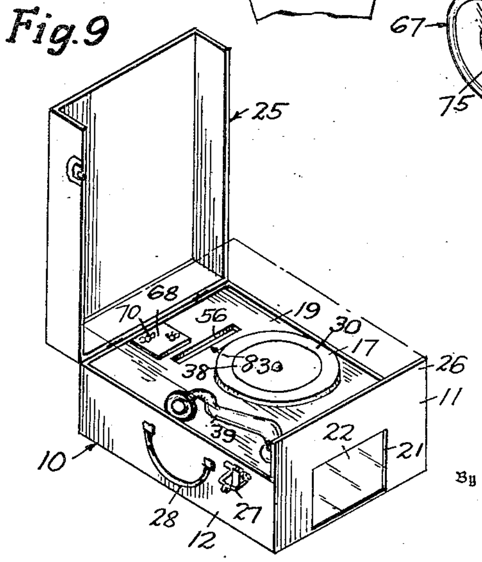
Fig. 9 is a perspective view of the device showing the carrying case open and parts ready to be set into operation.

In the practical embodiment of the invention shown by way of example, the carrying case 10 is provided with a front wall 11 of greater height than that of the side walls 12 or the rear wall 13 thereof (Figs. 2 and 9), to provide a screen opening and screen support of maximum area. Said walls are upstanding from the bottom wall 14 and together form the compartment 15 for the reception of the projector 16 and the operating means for the phonograph turntable 17 and for the picture disc 18. The top of the compartment 15 is normally closed by the top wall 19 which rests removably on the upper ends of suitable upright corner posts as 20 in the compartment. Said top wall 19 serves as the support for and carries all of the operating parts of the projector and phonograph, while the front wall 11 is provided with a suitable opening 21 of substantially the height of the side walls and at which the removable translucent viewing screen 22 is arranged. Said screen is preferably in the form of a sheet of glass or suitable plastic such as polyethylene, the edges being inserted into slots as 23 in the spaced upright guides 24 secured to the inner face of the front wall 11 and beyond the edges of the opening 21. The screen preferably extends to a point above the top of the top wall 19 for easy access to the top of the screen. Since the optical axis of the projector may be tilted somewhat out of the horizontal, the screen may also be correspondingly tilted, if desired, out of the vertical as will later be made clear in the description of the projector.

Hinged preferably to the rear wall 13 of the case 10, is the box-like cover 25 which has top, rear and side walls but no front wall. The upper part 26 of the front wall 11 of the case is intended to fit into the space between the side walls of the cover when the case is closed, as shown by the dash-dot line position of the cover shown in Fig. 9. Suitable latches as 27 hold the cover securely to the case 10, a handle as 28 being provided, by means of which the apparatus may readily be carried about. When the case is closed, the cover 25 is of sufficient height to receive those parts of the phonograph 30 which project above the upper surface of the top wall 19.

Any suitable type of phonograph or record player may be employed, but as shown the phonograph 30 is supported by a plate 31 secured to the upper face of the top wall 19. The phonograph comprises the turntable shaft 32 journalled in said plate, the turntable 17 on the shaft, and the motor 33 having the motor shaft 34 which terminates at its upper end in the driving roll 35. Frictionally engaging and driven by said roll is the friction wheel 36 on a suitable stud shaft supported by the plate 31, the wheel 36 engaging the inner face of the depending flange 37 of the turntable to rotate the turntable and its shaft 32 on the energization of the motor 33. The turntable carries a suitably grooved record 38 engageable by the needle or stylus of the usual tone arm 39 or the like in a manner which is well understood. As shown the tone arm 39 is secured to the top wall 19 and may be swung when desired to carry its needle into operative engagement with the record in the usual manner.

It will be noted that the turntable shaft 32 is utilized to operate the moving parts of the projector 16 through the intermediary of simple but effective mechanism. The picture disc 18 is rotated by such mechanism through the exact angle required to carry successive pictures (Fig. 3) into viewing position at predetermined intervals whereby the picture disc is properly indexed to permit projection of the pictures by the projector 16 on to the screen 22 while the picture disc is at rest. For this purpose, a friction wheel 40 (Fig. 2) is secured to the lower end of the turntable shaft 32 and engages the flange of the disc-like driving wheel 41 to rotate said wheel continuously as the turntable rotates.

Bent from the material of the body of the wheel 41 near the periphery thereof is the depending lug 42 serving as an integral bracket to support the rigid disc-operating pin in the form of a screw 43 passing through the lug and adjustably secured thereto as by means of the nuts 44 and 45. The end portion of the screw 43 projects radially from the bracket and beyond the wheel 41 and is adapted to engage the picture disc 18 and to rotate said disc through a predetermined angle on each revolution of the wheel 41. For this purpose, the edge of the disc is notched at intervals by the triangular notches 46 which are spaced apart circumferentially a distance corresponding to the spacing of the pictures 47 which are carried by the disc in any suitable manner. The disc 18 is rotatably and removably supported by means soon to be described. Other means are also provided to insure proper indexing on the intermittent rotation of the disc by the wheel 41 in spite of possible inaccuracies in adjustment or operation which might result in overthrow or underthrow of the disc by the pinscrew 43.

The indexing means comprises the blade spring 48 (Fig. 3) one end of which is secured to the bracket 49 which is fixed to the partition wall 50 later to be described in detail. The free end of the spring is shaped to conform to the triangular shape of the walls of the notch 46 and to fit thereinto when the disc 18 is at rest, there being a relatively sharp corner 51 where the inclined end portion 52 of the spring joins the body of the spring. Should the disc 18 be moved too far or past its proper position for picture projecting, by the screw 43, the corner 51 of the spring 48 engages the farther inclined side of the notch 46 within which the spring end is arranged, and presses against said side with sufficient force to rotate the disc slightly backwardly under the cam-like action thereon until the corners of the spring and notch coincide. Should the disc be moved insufficiently on the rotation of the wheel 41, the spring corner 51 engages the nearer inclined side of the notch 46 and presses against said side enough to rotate the disc forwardly until the notch and spring corners coincide.

Figure 8:
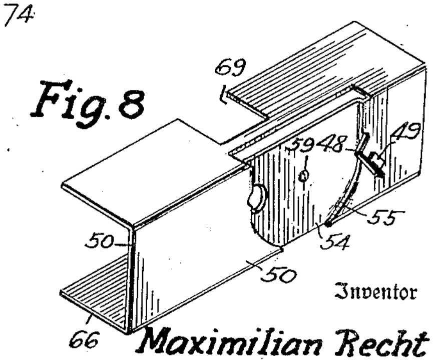
Fig. 8 is a perspective view of the partition wall for the light compartment showing the disc-supporting indent therein.

The means for supporting the picture disc for quick and easy removal when desired and for easy rotation will now be described. Said means comprises the partition wall 50 which separates the compartment 15 of the case 10 from the projection compartment 53. The partition wall 50 is preferably in the form of a channel (Fig. 8) the upper flange of which is secured to the under side of the top wall 19. The web of the channel is recessed to provide an indent 54 having arcuate side edges 55 at the lower part thereof adapted to engage the notched edge of and to support and guide the lower portion of the disc 18. In the top wall 19 above the indent 54, is provided a slot 56 slightly wider and longer than the corresponding thickness and diameter of the disc, through which slot the disc is passed downwardly to arrange it in the indent 54 until stopped by the side edges 55 of the indent. The top of the disc projects enough above the top wall 19 to permit ready access thereto for manipulation and replacement. In this position, the center of the disc is above the middle of the height of the case 10. Consequently, projection of that picture 47 which is at the side of the disc, along a horizontal axial line, would not be properly centered on the screen 22. For this reason, the optical axis of the projector 16 is inclined from the horizontal slightly downwardly and forwardly, thereby insuring correct centering of the picture image on the screen. The partition wall 50 which carries the projector is also tilted slightly out of the vertical as is the picture disc, thereby enabling proper projection of the pictures.

Figure 4:
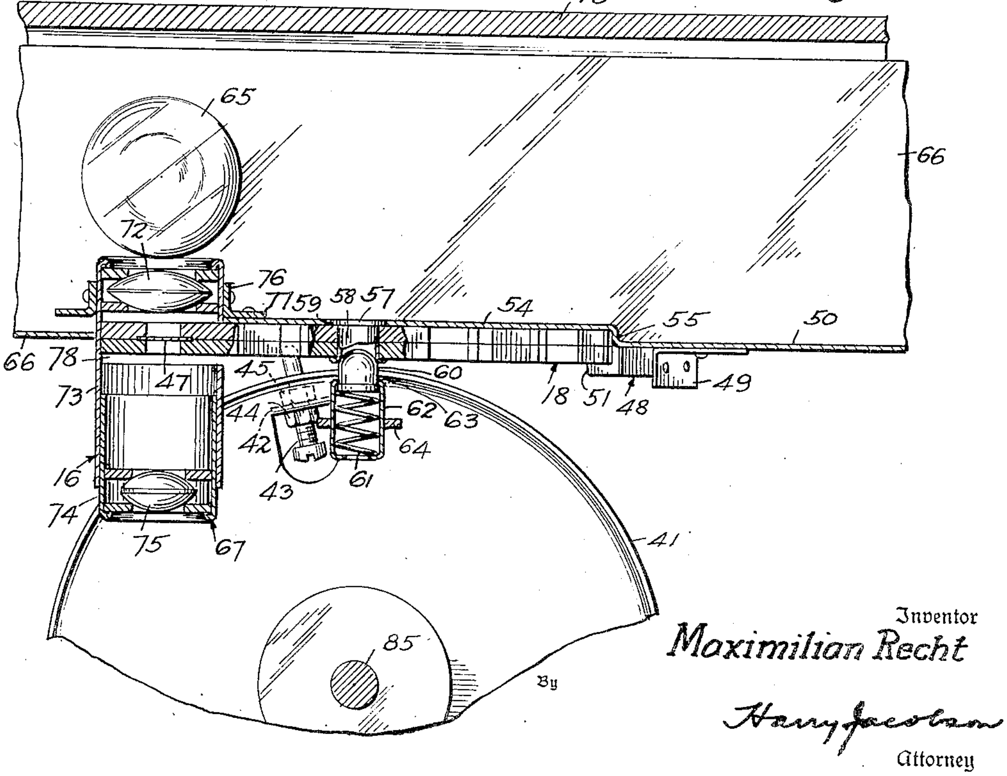
Fig. 4 is a horizontal sectional view taken on the line 4—4 of Fig. 3.
Figure 5:
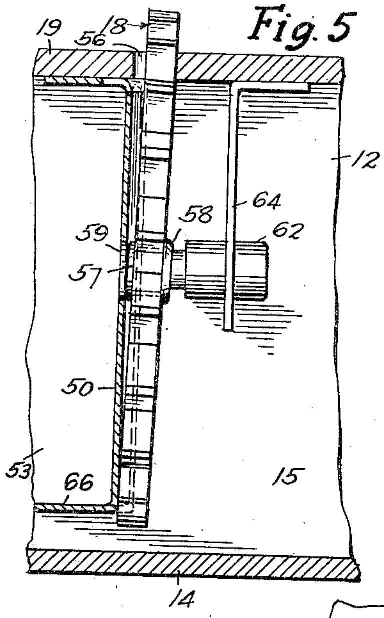
Fig. 5 is a fragmentary vertical sectional view taken on the line 5—5 of Fig. 1, of the picture disc and its supports, showing the parts in the positions assumed thereby at the initial part of the withdrawal movement of the disc or the final part of the inserting movement of the disc into the operative position thereof.

Passing through a suitable hole in the center of the picture disc, is the hollow rivet 58 having the cylindrical head 57 on the rear end thereof, the head projecting beyond the rear face of the disc. Said head is designed snugly to enter the cylindrical hole 59 in the web of the partition wall 50, the wall of which hole serves as a bearing for the rivet head and centers and rotatably supports the disc. To maintain the rivet head in the hole 59, a detent or button 60 is arranged axially of said hole and terminates at its rear end in a rounded or hemispherical surface having a diameter slightly larger than the inner diameter of the outwardly flanged or rolled head at the hollow open end of the rivet, the hollow rivet head projecting forwardly beyond the front face of the disc. Said rounded button member thereby enters the hollow end of the rivet to a slight extent under the influence of the spring 61 acting thereon when the disc is in the viewing position. The spring 61 is arranged in the interior of a suitable sleeve as 62 (Fig. 4) being maintained therein by the inturned rim at the front end of the sleeve. The spring presses against the enlarged base of the indent 60 at the other end of the sleeve. The rounded end of the detent projects rearwardly through the hole 63 at the rear end of the sleeve sufficiently to enter the hollow rivet when permitted to do so. The cylinder or sleeve 62 is supported by the bracket 64 secured to the undersurface of the top wall 19.

Figure 6:
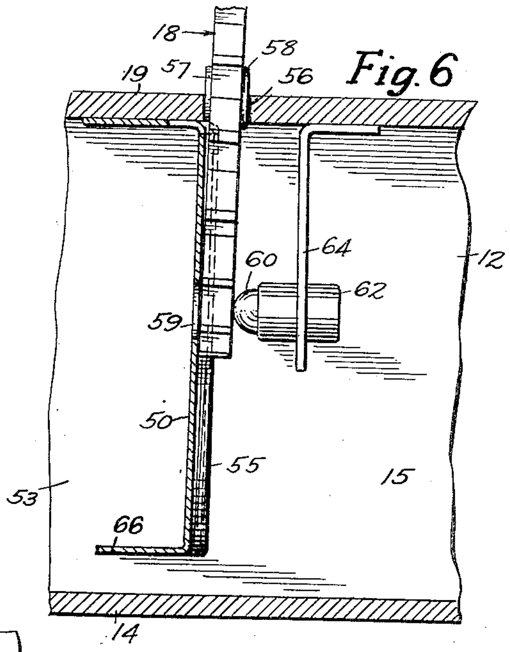
Fig. 6 is a similar view showing the picture disc during the final part of the withdrawal movement thereof or the initial part of the inserting movement.

To insert the disc 18 into viewing position, it is merely tilted forwardly and pushed downwardly through the slot 56 far enough to engage the lower parts of the arcuate side edges 55 of the indent 54. During such movement, the disc pushes the detents 60 and 48 out of the way until the lowermost position of the disc is reached. When the disc is released from its tilted position, the rivet head enters the hole 59 of the partition wall under the pressure of the indent 60 which has entered the front hollow head of the rivet, and the detent 51 enters a notch 46 if aligned therewith. If not so aligned, the disc may be manually rotated enough to carry the notch and the detent 51 into registration. Since the top of the disc is preferably tilted forwardly during insertion, the side edges 55 of the indent may be continued in arcuate form to provide a substantially circular indent throughout the height of the wall 50, in an obvious manner, without interfering with the insertion or withdrawal of the disc. To remove the disc, its top is again tilted forwardly to withdraw the rivet head 57 from the hole 59, whereafter lifting movement of the disc cams the rounded end of the detent 60 out of the front hollow head of the rivet and then frees the disc for complete withdrawal as seen in Fig. 6.

Figure 3:
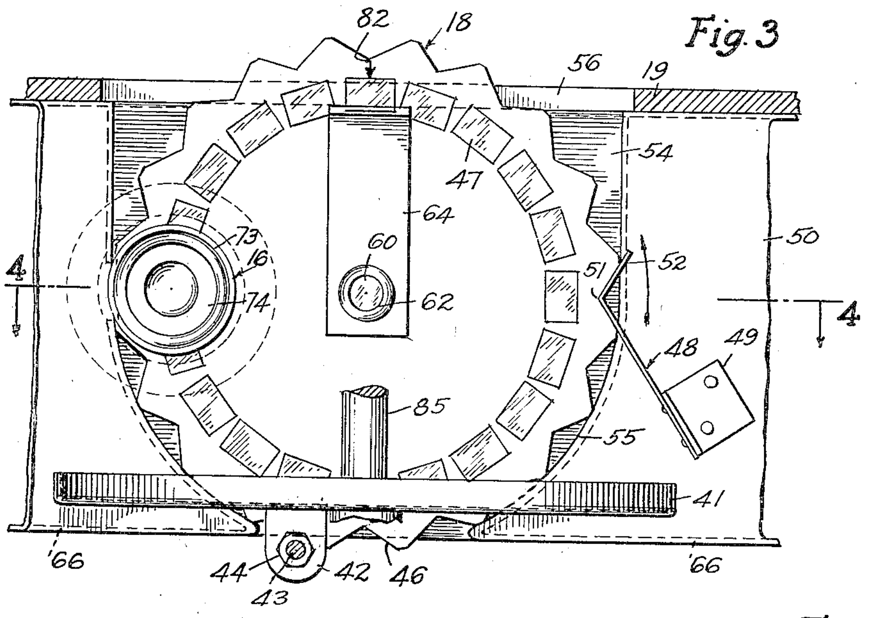
Fig. 3 is a fragmentary vertical sectional view, taken on the line 3—3 of Fig. 1, of the means for intermittently rotating the picture disc.

When the detent 51 is in a notch 46 at the lowermost position of the disc in the slot 56, the disc is in the viewing position wherein a picture 47 at the left side of the disc as viewed in Fig. 3 is arranged between the lamp 65 of the projector 16 and the screen 22. Said lamp is mounted in a suitable socket secured to the lower flange 66 of the channel partition wall 50 within the compartment 53. Since the heat from the lamp is considerable, suitable holes may be made in the rear wall 13 of the compartment and in the top wall 19 for ventilating purposes, it being noted that the metallic partition wall 50 in addition to its supporting function, also serves to dissipate heat from the lamp and to prevent light from the lamp from reaching the screen except through the objective 67. Access to the lamp for replacement or repair is had through the removable door or flap 68 in the top wall 19 and the registering cut-out 69 in the top flange of the partition wall 50, the door 68 being normally held in place as by the wing nuts 70. Optionally or additionally, a suitable door may be made at any convenient point as in the rear wall 13 to provide access to the lamp.

The projector 16 also comprises the condenser lens 72 suitably mounted in a tube 73 into which is telescoped the second tube 74 for focussing purposes. The objective lens 75 is mounted in the tube 74 on the front side of the partition wall. The holding tube 73 for the condenser lens is fixed to the web of the partition wall 50 in alignment with the lamp and the screen, and as has been indicated, is tilted slightly forwardly and downwardly. To secure the tube 73 in place, a collar as 76 is fixed to the rear portion of said tube which projects into the lamp compartment, the collar being provided with an outstanding flange 77 secured to the rear face of the partition.

The tube 73 passes completely through said wall and is slotted as at 78 in front of the wall to permit the side portion of the picture disc to pass through the major part of the tube between the lenses 72 and 75. It will be noted that by reason of the employment of the telescoping tubes for the lenses and the use of a slot in one of the tubes for the reception of the picture disc, the lenses are accurately and automatically aligned coaxially of each other in a simple and economical manner and are mechanically associated to insure alignment, instead of being separately supported and hence subject to misalignment as has heretofore been customary in projecting apparatus of the general character here involved.

A switch 80 is arranged in the top wall 19 for energizing the lamp 65, and a separate switch 81 for energizing the motor 33. Consequently, the user may choose to listen to the sound without looking at the picture in which case the switch 81 only is closed. When the viewer wishes to synchronize the sound with the pictures, the phonograph needle is not immediately placed on the record. For accurate synchronization, the viewer should be apprised of the moment when the needle is to be placed on the sound record and the sound started. This is when the first picture is initially positioned for viewing and while it is at rest. This is also when the free end part of the screw 43 moves out of the notch 46 between the first and final pictures.

Figure 10:
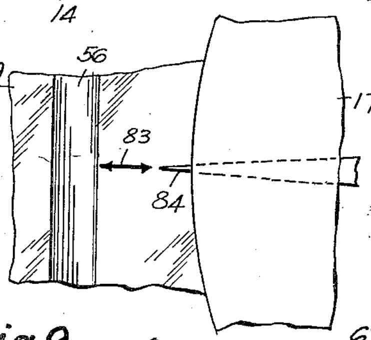
Fig. 10 is a fragmentary top plan view of the top wall showing the synchronizing indications thereon and the pointer therefor.
Figure 7:
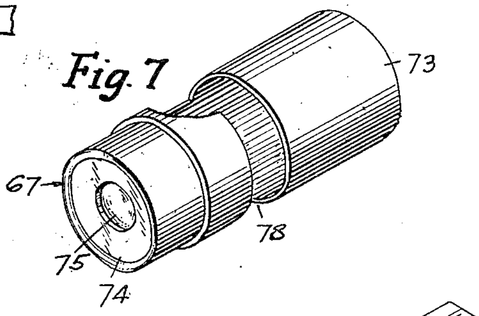
Fig. 7 is a perspective view of the combined light condenser and objective lenses, showing the slot in the lens-holding tube for the reception of a peripheral part of the picture disc.

As viewed in Fig. 3, the first picture or the one corresponding to the beginning of the record 38 would be at the left side of the disc. When the first picture is in this position, another picture removed angularly about 90° from the first is at the top of the disc. The latter picture is marked with a suitable designation such as the arrow 82 so as to be visible when the picture disc is in its initial viewing position in the slot 56. A corresponding synchronizing designation in the form of the arrow 83 is arranged on the top wall 19 at about the middle of the slot 56 as best seen in Fig. 10. An indication in the form of the movable pointer 84 having an attaching sleeve is fixed to the upper end of the shaft 85 for the wheel 41 or to the nut at said upper end. Said pointer turns with the wheel and the moment when it registers with or points to the other synchronizing marks 82 and 83 during the rotation of the wheel, is the time to set the phonograph needle on the beginning of the sound record, the screw 43 at that time just beginning to leave the notch 46 above mentioned.

The picture disc having been inserted in place with the arrow 82 thereof somewhat to the right of the fixed arrow 83, the sound switch 81 is closed. When the picture disc is rotated sufficiently by the phonograph motor to carry the moving arrow 82 close to the fixed arrow 83, the picture switch 80 is closed. When the arrows 82 and 83 are almost opposite each other, if the pointer 84 has not been carried around to said arrows, the turntable 17 is rotated manually to bring the indicator to the arrows so that the arrows and the pointer 84 are aligned, and the needle of the tone arm is placed on the beginning of the record to start the sound.

It will now be seen that I have provided a highly simplified relatively inexpensive compact and portable device well adapted and designed to perform efficiently the functions intended and to meet commercial requirements. While certain specific forms of the invention have herein been shown and described, it is obvious that various changes may be made therein without departing from the spirit of the invention defined in the appended claims.

I claim:

1. In a combined sound and picture projecting apparatus, a phonograph, a picture projector, a wall carrying said phonograph and projector, a container case for the phonograph and projector, means at the corners of the case for supporting the wall in a position wherein the wall rests upon said means and is arranged at the uppermost part of the case, said case having a front wall projecting above the remainder of the case and having a screen-receiving opening therein of substantially the height of said remainder of the case, a cover hinged to the case and having an opening at the front thereof to receive the projecting part of the front wall of the case when the cover is closed, a partition wall depending from the first mentioned wall into the case and separating the case into a lamp compartment and a compartment for the driving mechanism of the phonograph and projector, the first mentioned wall having a slot therein for the passage of a picture disc, means on the lower part of the partition wall for engaging and supporting the lower edge part of a picture disc, means on the partition wall and passing therethrough for supporting spaced parts of the projector on opposite sides respectively of said partition wall and in position to project a picture centrally of the opening in the front wall of the case and a bearing on the partition wall for centering and rotatably supporting a picture disc.

2. The apparatus of claim 1, the first-mentioned wall having an opening therein above the lamp compartment, and a removable cover for said last-mentioned opening, the partition wall being inclined slightly out of the vertical, and the means on the partition wall for engaging and supporting the lower edge part of the disc comprising an indent in the partition wall having arcuate side edges at the lower part thereof shaped to fit and to engage the side edge of the disc, and individual switches for respectively controlling operation of the phonograph and of the projector.

3. In a combined phonograph and picture projector, a top wall having a slot therein, a phonograph carried by the wall, a picture-carrying disc, a partition wall depending from the top wall and provided with an indent, the indent having a front face to engage the rear face of the disc and having arcuate side edges substantially perpendicular to said front face and rigidly and intergrally connecting said front face to said side edges to engage and guide the lower portion of the outermost edge of the disc when the disc is inserted through the slot and into the indent, thereby to support the disc rotatably, cooperating elements on the partition wall and the disc for centering and supporting the rear central part of the disc, an additional spring-pressed element centering and supporting the front central part of the disc, means spaced horizontally from the center of the disc for projecting a picture of the disc, and means operated by the phonograph for intermittently rotating the disc.

4. The combined phonograph and picture projector of claim 3, the disc having equally spaced substantially isosceles triangular edge notches therein, the disc rotating means comprising a continuously rotatable wheel arranged with the axis thereof perpendicular to the axis of the disc centering and supporting means, a radially adjustable pin projecting substantially radially from the wheel and adapted to enter the notches successively and means for adjustably supporting the pin.

5. The combined phonograph and picture projector of claim 4, and an isosceles triangular spring indent for the notches functioning to index the disc by moving the disc by spring action into picture projecting position on overthrow and underthrow of the disc out of said position by the pin.

6. The combined phonograph and picture projector of claim 3, the centering and supporting element on the disc comprising a hollow rivet having a substantially cylindrical head at one end projecting rearwardly from the center of the disc and having a hollow rolled head at the other end projecting forwardly from the center of the disc, the centering and supporting element on the partition wall comprising a bearing cooperating with and receiving the cylindrical rivet head and constituting the wall of a cylindrical hole in the partition wall.

7. The combined phonograph and picture projector of claim 6, the additional centering and supporting element comprising a sleeve, a member slidable in the sleeve and having a rounded end projecting beyond the sleeve and a spring in the sleeve urging the member rearwardly, the diameter of the rounded end being greater than the inner diameter of the hollow head of the rivet.

8. The combined phonograph and picture projector of claim 3, the additional centering and supporting element comprising a spring-pressed member having a rounded end of greater diameter than the inner diameter of the hollow head of the rivet and entering said hollow head.

9. In a combined sound and picture projecting apparatus, a sound record, means for continuously rotating the record, a picture disc having edge notches therein and having a central headed hollow rivet therethrough, means operated by the record rotating means for intermittently rotating the picture disc, means engaging both ends of the rivet for removably centering and supporting the central part of the disc, a wall having an indent therein, the indent having a substantially semi-circular side edge wall of substantially the same diameter as the disc, removably engaging and supporting the lower edge part of the disc in substantially upright position, picture projecting means comprising a condenser lens and an objective lens spaced axially apart, a pair of telescoping coaxial tubes respectively carrying the lenses on opposite sides of the wall, and means for fixedly securing the outer of the tubes to the wall, said outer tube passing through the wall and having a circumferential slot therein around the major part of the circumference thereof and between the lenses for the reception of a side peripheral portion of the disc, the inner tube being axially movable in the outer tube.

10. The apparatus of claim 9, the bottom edge of the wall being arranged rearwardly of the top edge thereof to tilt said wall out of the vertical, and the tubes being tilted to arrange the common axis thereof in a position inclined forwardly and downwardly.

11. The apparatus of claim 9, the notches in the disc being isosceles the means for rotating the disc comprising a continuously rotatable wheel arranged with the axis thereof substantially perpendicular to the axes of the disc and of the disc centering and supporting means, a screw projecting radially of the wheel and successively entering the notches and having an adjustable connection to the wheel whereby the distance of the outer end of the screw from the notches of the disc is variable to vary the interval between intermittent rotational movements of the disc, and a spring detent shaped to fit into the notches and to index the disc and thereby to move the disc solely by the spring action thereof sufficiently to correct overthrow and underthrow of the disc by the pin.

12. In a combined sound and picture projecting apparatus, a picture disc, means for supporting and intermittently rotating the disc, rotatable sound reproducing means having an operative connection with the disc-rotating means, and a picture projector for the disc comprising a first fixed tube arranged with the axis thereof substantially parallel and in spaced relation to the axis of the disc when the disc is substantially upright in the picture projecting position thereof, said first tube having a circumferential cut-out for the major part of the way around the circumference thereof for the passage therethrough of a side peripheral portion of the disc whereby a picture on the disc is arranged in the cut-out and between the ends of said first tube, a condenser lens at one end of the first tube, a second tube movably telescoped into the other end of the first tube and an objective lens in the second tube for focusing the projected picture on a screen on the movement of said second tube.

13. In a combined sound and picture projecting apparatus, a picture disc having an indication thereon to determine the proper position of the disc for projecting the first picture carried by the disc, means for intermittently rotating the disc including a wheel continuously rotatable about an axis perpendicular to the axis of the disc, a shaft fixed to the wheel, and means on and adjustable radially of the wheel for engaging and advancing the disc intermittently and for varying the time interval between movements of the disc, means for successively projecting consecutive pictures on the disc while the disc is at rest, a fixed indication adjacent the disc adapted to cooperate with the indication on the disc to locate the first picture, a visible movable pointer fixed to the shaft and radially of and in parallel spaced relation to the wheel to rotate with the wheel and past the fixed indication to indicate when the projection of a picture on the disc is begun, sound reproducing means having an operative connection with the disc-rotating means, and a manually operable switch controlling the sound reproducing means.

14. In combined sound and picture projecting apparatus, a picture disc having triangular edge notches therein, and means for intermittently rotating the disc comprising a continuously rotatable wheel arranged with the axis thereof perpendicular to the axis of the disc, and a rigid threaded pin screwed into and projecting radially from and beyond the periphery of the wheel and adapted to enter the notches successively and having the axis thereof substantially parallel to the axis of the disc and varying the interval between intermittent movements of the disc when said pin is projected varying distances from said periphery.

15. The apparatus of claim 14, each of the triangular notches in the disc being isosceles, means for rotatably supporting the disc including a wall, a resilient isosceles triangular detent adapted to enter and to leave the notches successively on the rotation of the disc thereby to index the disc by moving the disc solely by the spring action of the detent in said notch when the pin fails to move disc precisely into its proper picture projecting position, and means carried by the wall for projecting images of pictures carried by the disc when the pictures successively reach a position at the projection aperture side of the disc.

16. The apparatus of claim 15, the projecting means comprising a lamp on one side of the wall, a first tube fixed to and passing through the wall to project beyond both faces of the wall and having a cut-out around the major part of the circumference thereof for the reception of a peripheral portion of the disc, a condenser lens in the first tube and on the lamp side of the wall, a second tube telescoped into and movable in the other end of, and supported solely by, the first tube, and an objective lens in the second tube.

17. In a hand portable sound and picture projecting apparatus, means for continuously rotating a sound record disc, means operated by the disc-rotating means for intermittently rotating a picture disc, a carrying case having side, bottom, rear and front walls, a box-like cover hinged to the rear edge of the case, a carrying handle on the cover, a top wall for the case exposed when the cover is open, means within the case for removably supporting the top wall, said top wall supporting the means for rotating the sound disc and the picture disc hereinbefore mentioned, a partition wall in the form of a channel having a flange supported by the top wall and having a web extending toward the bottom wall, said web dividing the case into a lighting compartment and a mechanism compartment, a lens in the lighting compartment, a second lens in the mechanism compartment, a common support for the lenses comprising a pair of telescoping tubes, one of the tubes having part thereof on one side of the web and another part thereof on the opposite side of the web and having a circumferential slot therein for the passage into the tube of part of the disc, said tube carrying the first mentioned lens, means fixing said tube to the web, the other of said tubes carrying the second lens and being movable in the first mentioned tube, said tubes arranging the respective lenses on opposite sides of the web.

18. The apparatus of claim 17, the front wall having an opening therein of substantially the entire height of the side and rear walls, the top portion of the front wall projecting above the opening and above the top wall whereby a screen substantially covering the opening and in position to receive the image of a picture projected thereon by the lenses has a usable area of maximum height equal to the distance between the under face of the top wall and the upper face of the bottom wall, the center of the image being projectable to the center of the screen when the image is of the full height of the opening, said top portion of the front wall closing the space hereinafter mentioned in the front of the cover when the cover is closed, said cover having side, top and rear walls and having a space at the front thereof for the reception of the upwardly projecting portion of the front wall of the case whereby the case and cover completely enclose the means hereinbefore mentioned, the carrying handle being secured to the side wall of the cover, and latching means holding the cover to the case.

References Cited in the file of this patent

UNITED STATES PATENTS

| | | |
|---|---|---|
| 1,094,704 | Clubb et al. | Apr. 28, 1914 |
| 1,696,831 | Baker | Dec. 25, 1928 |
| 2,240,446 | Volney | Apr. 29, 1941 |
| 2,631,495 | Ronick | Mar. 17, 1953 |